Patented Aug. 8, 1933

1,921,378

UNITED STATES PATENT OFFICE 1,921,378

PRODUCTION OF POLYMERIZATION PRODUCTS FROM ALKYLENE OXIDES

Franz Webel, Mannheim, Germany, assignor to I. G. Farbenindustrie Aktiengesellschaft, Frankfort-on-the-Main, Germany No Drawing. Application November 13, 1930, Serial No. 495,540, and in Germany November 27, 1929

10 Claims. (Cl. 260—54)

The present invention relates to the production of polymerization products.

It is already known that ethylene oxide may be polymerized to a wax-like substance by allowing liquid ethylene oxide to stand over caustic potash or zinc chloride for several months or by heating the liquid oxide with a very small quantity of caustic potash solution to from 50° to 60° C. The polymerization of liquid ethylene oxide with the aid of catalysts such as alkali metals, tertiary amines, tin tetrachloride and the like is also known. When employing tin tetrachloride, dioxane is also formed and the process has to be carried out in a sealed tube and in the cold or at room temperature in order to avoid explosions. Nevertheless, by this method, even when employing not very considerable amounts of ethylene oxide, explosions cannot be avoided with certainty. The duration of the polymerization amounts to from several days to a month.

I have now found that the polymerization of alkylene oxides, such as ethylene oxide or $\alpha$ propylene oxide, is effected rapidly and entirely without danger by contacting vaporous alkylene oxide, such as ethylene or $\alpha$ propylene oxides, with polymerization catalysts at elevated temperatures. In this manner either the from solid to liquid wax-like highly polymerized products alone or dioxane, or its homologues when $\alpha$ propylene oxide is employed, are obtained according to the nature of the catalysts employed. For example sodium bisulphate and other acid reacting substances such as aluminium sulphate, or mixtures of the said salts with small amounts of sulphuric acid or with a diluent consisting of a neutral salt such as sodium sulphate or the like are suitable catalysts for the preparation of dioxane and its homologues. Acid phosphates might be used but acid alkali metal sulphates are much more efficient. Strongly alkaline reacting substances such as caustic potash, caustic soda and the oxides or hydroxides of the other alkali metals i. e. rubidium, caesium and lithium are suitable for the preparation of wax-like products the strongest alkali bases giving usually the best results. The temperatures of working are generally between 40° and 200° C. the range between about 100° and 160° C. being preferred for a conveniently quick reaction.

The following examples will further illustrate the nature of this invention, but the invention is not restricted to these examples.

Example 1

Vaporous ethylene oxide is led over anhydrous caustic potash which is in the form of pieces of convenient size and is situated in a vertical iron tube which is maintained at a temperature of from 120° to 130° C. The regulation of the temperature is preferably effected by means of a jacket tube in which is circulated a suitable liquid, as for example ethylene glycol, which has been brought to the necessary temperature. The liquid serves the duel purpose of maintaining the reaction temperature and leading away a part of the heat of reaction; this latter, especially at the commencement when the caustic potash is not coated with a layer of polymerized ethylene oxide, is so great that, without cooling, the pieces of caustic potash would fuse together. It is preferable to take care that there is also cooling in the reaction chamber by supplying more ethylene oxide than is polymerized; the excess of ethylene oxide escapes at the lower end of the tube, is condensed in a cooler and vaporized again. After some time the polymerized ethylene oxide begins to drop in the form of a pale yellow syrupy liquid from the lower end of the tube into the closed receiver, in which it solidifies to a waxy or horn-like mass. It usually contains small pieces of caustic potash enclosed therein, from which it may be freed by dissolving in benzene, filtering and evaporating. The yield of polymerized ethylene oxide is quantitative.

Example 2

Vaporous ethylene oxide is led over freshly fused anhydrous sodium bisulphate which is situated, in the form of pieces of convenient size, in a vertical tube heated to about 120° C. The vapours leaving the lower end of the tube are condensed in a cooler and the condensate is evaporated again and returned into the process. Only volatile reaction products are formed; wax-like polymerization products are not formed.

After about 24 hours the boiling point of the liquid collected in the condenser is appreciably increased. The liquid is then fractionated. In addition to unchanged ethylene oxide and small amounts of ethylidene glycol acetal having a boiling point of 82° C. dioxane having a boiling point of from 99° to 101° C. is obtained in a yield of about 75 per cent of the ethylene oxide consumed.

Example 3

α propylene oxde is vaporized and the vapors are passed over anhydrous potassium hydroxide at 120° C. in the manner described in Example 1. The polymeric oxide is obtained as a viscous, slightly yellowish liquid which is insoluble in water but is soluble in most organic solvents such as ethyl alcohol, ethyl ether and hydrocarbons of the benzene series. The yield is practically quantitative.

Example 4

Vapors of α propylene oxide are passed at 120° C. over a catalyst prepared by mixing 25 parts of sodium acid sulphate with 75 parts of anhydrous sodium sulphate. From the vapors issuing from the reaction vessel dimethyl dioxane is removed by condensation whereas the unaltered propylene oxide is returned into the vessel for evaporating the propylene oxide and then into the reaction vessel. The crude product obtained is distilled in vacuo at about 20 millimeters mercury gauge and at about 50° C. whereby small quantities of non-volatile sulphuric esters are kept behind and is then subjected to fractional distillation at atmospheric pressure. Dimethyl dioxane, having a boiling point of 117° C. is obtained in a yield of about 70 per cent

What I claim is:—

1. In the production of polymerization products from alkylene oxides, the step which comprises contacting vapors of an alkylene oxide selected from the group consisting of ethylene oxide and α-propylene oxide with a solid, inorganic, alkaline reacting substance while heating.

2. In the production of polymerization products from alkylene oxides, the step which comprises contacting vapors of ethylene oxide with a solid, inorganic, alkaline reacting substance while heating.

3. In the production of polymerization products from alkylene oxides, the step which comprises contacting vapors of ethylene oxide with a caustic alkali while heating to temperatures between 100° and 160° C.

4. In the production of polymerization products from alkylene oxides, the step which comprises contacting vapors of an alkylene oxide selected from the group consisting of ethylene oxide and α-propylene oxide with a solid, acid reacting salt while heating.

5. In the production of polymerization products from alkylene oxides, the step which comprises contacting vapors of an alkylene oxide selected from the group consisting of ethylene oxide and α-propylene oxide with sodium acid sulphate while heating to temperatures between 100° and 160° C.

6. In the production of polymerization products from alkylene oxides, the step which comprises contacting vapours of an alkylene oxide selected from the group consisting of ethylene oxide and α-propylene oxide with a solid, non-metallic, inorganic polymerization catalyst while heating to temperatures between 40° and 200° C.

7. In the production of polymerization products from alkylene oxides, the step which comprises contacting the vapors of an alkylene oxide selected from the group consisting of ethylene oxide and α-propylene oxide with a solid, inorganic alkaline reacting substance while heating to temperatures between 40° and 200° C.

8. In the production of polymerization products from alkylene oxides, the step which comprises contacting the vapors of ethylene oxide with a solid, inorganic alkaline reacting substance while heating to temperatures between 40° and 200° C.

9. In the production of polymerization products from alkylene oxides, the step which comprises contacting the vapors of ethylene oxide with a solid, inorganic alkaline reacting substance while heating to temperatures between 100° and 160° C.

10. In the production of polymerization products from alkylene oxides, the step which comprises contacting the vapors of an alkylene oxide selected from the group consisting of ethylene oxide and α-propylene oxide with a solid, inorganic alkaline reacting substance while heating to temperatures between 100° and 160° C.

FRANZ WEBEL.